United States Patent
Dadalas et al.

(10) Patent No.: US 7,462,667 B2
(45) Date of Patent: Dec. 9, 2008

(54) PRIMER COATING OF PTFE FOR METAL SUBSTRATES

(75) Inventors: Michael C. Dadalas, Eggenfelden (DE); Klaus Hintzer, Kastl (DE); Gernot Loehr, Burgkirchen (DE); Tilman Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/172,345

(22) Filed: Jun. 30, 2005

(65) Prior Publication Data
US 2006/0003168 A1    Jan. 5, 2006

(30) Foreign Application Priority Data
Jul. 5, 2004   (EP) ................... 04103178

(51) Int. Cl.
*C08L 37/12* (2006.01)
(52) U.S. Cl. .................. 524/544; 524/545; 526/242; 526/250
(58) Field of Classification Search ................ 524/544, 524/545; 526/242, 250
See application file for complete search history.

(56) References Cited

U.S. PATENT DOCUMENTS

| | | | |
|---|---|---|---|
| 3,981,945 A | 9/1976 | Attwood et al. | |
| 4,049,863 A | 9/1977 | Vassiliou | |
| 4,090,933 A | 5/1978 | Nozik | |
| 4,131,711 A | 12/1978 | Attwood | |
| 4,282,162 A * | 8/1981 | Kuhls | 554/193 |
| 4,391,940 A | 7/1983 | Kuhls et al. | |
| 4,548,986 A | 10/1985 | Suzuki et al. | |
| 5,160,791 A | 11/1992 | Tannenbaum | |
| 5,168,013 A | 12/1992 | Tannenbaum | |
| 5,168,107 A | 12/1992 | Tannenbaum | |
| 5,223,343 A | 6/1993 | Tannenbaum | |
| 5,229,480 A | 7/1993 | Uschold | |
| 5,230,961 A | 7/1993 | Tannenbaum | |
| 5,285,002 A | 2/1994 | Grootaert | |
| 5,494,752 A * | 2/1996 | Shimizu et al. | 428/407 |
| 5,576,381 A | 11/1996 | Bladel et al. | |
| 5,688,884 A | 11/1997 | Baker et al. | |
| 5,700,859 A | 12/1997 | Ogura et al. | |
| 5,763,552 A | 6/1998 | Feiring et al. | |
| 5,804,650 A | 9/1998 | Tsuda et al. | |
| 5,895,799 A | 4/1999 | Wu et al. | |
| 5,973,091 A * | 10/1999 | Schmiegel | 526/247 |
| 6,025,307 A | 2/2000 | Chittofrati et al. | |
| 6,103,843 A | 8/2000 | Abusleme et al. | |
| 6,126,849 A | 10/2000 | Yamana et al. | |
| 6,333,372 B1 * | 12/2001 | Tomihashi et al. | 524/104 |
| 6,642,307 B1 | 11/2003 | Sogabe et al. | |
| 6,825,250 B2 * | 11/2004 | Epsch et al. | 523/310 |
| 6,833,403 B1 | 12/2004 | Bladel et al. | |

FOREIGN PATENT DOCUMENTS

| | | |
|---|---|---|
| CA | 2123528 | 11/1994 |
| EP | 0124085 A2 | 11/1984 |
| EP | 373588 A2 * | 6/1990 |
| EP | 0373588 A2 | 6/1990 |
| EP | 0606493 B1 | 7/1994 |
| EP | 0 712 882 A1 | 5/1996 |
| EP | 0 816 397 A1 | 1/1998 |
| EP | 0 894 541 A1 | 2/1999 |
| EP | 1 059 342 A1 | 12/2000 |
| WO | WO 00/17590 A1 | 11/2000 |
| WO | WO 02/14065 A1 | 2/2002 |
| WO | WO 2004/202524 A1 | 3/2004 |

* cited by examiner

*Primary Examiner*—Peter D. Mulcahy
*Assistant Examiner*—Henry Hu
(74) *Attorney, Agent, or Firm*—Julie A. Lapos-Kuchar; Brian E. Szymanski

(57) ABSTRACT

The present invention provides an aqueous coating composition comprising (i) particles of a non-melt processible polymer of tetrafluoroethylene and (ii) a non-fluorinated polymer selected from the group consisting of a polysulfone, a polyamide, a polyimide, a polyamide-imide, a polybismaleimide and mixtures thereof, wherein said particles are core-shell particles whereby the shell comprises a copolymer of tetrafluoroethylene and a partially fluorinated or non-fluorinated comonomer. The aqueous coating composition may be used for providing a primer coating on a substrate such as a metal or glass substrate. Such primer coating may provide good or excellent non-stick coatings combined with good or excellent scratch and wear resistance of the coating. Also, such primer coating may provide for good to excellent PTFE coatings that can resist hot salt water. The aqueous coating composition may also be used to provide other coating layers of a multi-layer coating.

13 Claims, No Drawings

PRIMER COATING OF PTFE FOR METAL SUBSTRATES

This application claims priority from European Patent Application No. 04103178.2, filed Jul. 5, 2004, herein incorporated by reference in its entirety.

FIELD OF THE INVENTION

The present invention relates to a coating composition for coating metal substrates with polytetrafluoroethylene. The invention further relates to a method of coating a metal substrate with such compositions and to metal substrates so coated.

BACKGROUND OF THE INVENTION

Polytetrafluoroethylene polymers (PTFE) are well known for their superior heat resistance, chemical resistance, corrosion resistance and anti-stick properties. Because of these properties, PTFE has found a wide range of applications including the use in so-called non-stick coatings on metal substrates such as cookware including cook, bake and frying articles.

However, because of its excellent anti-stick properties, special measures need to be taken to provide good adherence of a PTFE coating to a metal substrate. Accordingly, the art has developed special coating systems to provide PTFE anti-stick coatings on metal substrates. Examples of such coating systems can be found in for example EP 894541, WO 02/14065, U.S. Pat. Nos. 5,160,791; 5,230,961; 5,223,343; 5,168,107 and U.S. Pat. No. 5,168,013. Anti-stick coatings on substrates such as metal and glass typically comprise of two or more layers although a single layer has been contemplated as well.

Typically, these coating systems include two layers consisting of a specially formulated primer and topcoat, but systems incorporating one or more intermediate coats are also known. The primers for such systems typically contain a heat resistant organic binder resin and one or more fluoropolymer resins, along with various opaque pigments and fillers. The intermediate coats contain mainly fluoropolymers with some amounts of opaque pigments, fillers and coalescing aids, while the topcoats are almost entirely composed of fluoropolymers.

EP 124085 discloses a primer coating composition that comprises: (a) a modified tetrafluoroethylene polymer in the form of particles of double-layer structure having a core and a shell, the core comprising a tetrafluoroethylene homopolymer or a copolymer of tetrafluoroethylene with a fluorine-containing α-olefin represented by the formula

wherein R is a member selected from the group consisting of chlorine, and perfluoroalkyl, polyfluoroalkyl, perfluoroalkyloxy and polyfluoroalkyloxy each having 1 to 10 carbon atoms, and said alkyl or alkyloxy groups may have one or more oxygen atom in their chain, the shell comprising a copolymer of tetrafluoroethylene and the fluorine-containing α-olefin copolymerized therewith in a larger amount than in the core,
(b) a copolymer of tetrafluoroethylene and the fluorine-containing α-olefin uniformly copolymerized therewith, and
(c) an auxiliary adhesive agent selected from the group consisting of polyimide, polybismaleimide, polyamideimide and aromatic polyamide.

WO 02/14065 provides multiple coat non-stick coating systems, which include a primer, topcoat, and optionally, a midcoat, as well as substrates coated with the non-stick coating systems. The primer of the multiple coat system includes a fluoropolymer, which is a polymer including a $CF_2$—$CH_2$ moiety in the polymer chain. As an example thereof, a fluoropolymer copolymer is disclosed, such as a fluoropolymer terpolymer including repeating monomers of tetrafluoroethylene (TFE), hexafluoropropylene ("HFP"), and vinylidene fluoride (VDF).

SUMMARY OF THE INVENTION

Despite the many known coating compositions for coating metal substrates, there continues to be a need to find further suitable compositions and preferably compositions that can further improve the adhesion of PTFE coatings to substrates, in particular metal substrates. Generally, it will be desired that such coating compositions can be readily manufactured in a convenient and cost effective way and preferably such compositions should be compatible with existing manufacturing methods for making coated substrates, in particular coated metal substrates such as in cookware. Desirably, the coating compositions is apt to be applied in applications were coatings come into contact with food. Also, the coating should provide good heat resistance, corrosion resistance and anti-stick properties and should adhere well to the substrate such that good or excellent scratch and wear resistance of the coating can be obtained. Desirably, the coating composition can provide a tough coating on a metal substrate that can withstand conditions that may occur during normal use of the article bearing such coating. For example, it would be desirable to have a coating with good or excellent resistance to hot salt water.

The present invention provides an aqueous coating composition comprising (i) particles of a non-melt processible polymer of tetrafluoroethylene and (ii) a non-fluorinated polymer selected from the group consisting of a polysulfone, a polyamide, a polyimide, a polyamide-imide, a polybismaleimide and mixtures thereof, wherein said particles are core-shell particles whereby the shell comprises a copolymer of tetrafluoroethylene and a partially fluorinated or non-fluorinated comonomer.

The aqueous coating composition may be used for providing a primer coating on a substrate such as a metal or glass substrate. Such primer coating may provide good or excellent non-stick coatings combined with good or excellent scratch and wear resistance of the coating. Also, such primer coating may provide for good to excellent PTFE coatings that can resist hot salt water. The aqueous coating composition may also be used to provide other coating layers of a multi-layer coating.

Accordingly, in a further aspect, the present invention provides a method comprising applying the coating composition on a substrate. The invention in a still further aspect provides substrates that have been coated according said method.

4. DETAILED DESCRIPTION OF THE INVENTION

The composition for the primer coating is typically an aqueous dispersion of particles of non-melt processible polytetrafluoroethylene (PTFE). By the term "non-melt processible polytetrafluoroethylene" is meant that the melt viscosity of the polytetrafluoroethylene is so high that conventional melt processing equipment cannot be used to process the polytetrafluoroethylene. This means in general that the melt viscosity is $>10^{10}$ Pa.s.

The particles of PTFE are conveniently produced using an aqueous emulsion polymerization of TFE. The polymerization may optionally involve the use of a perfluorinated comonomer such as for example a perfluorinated vinyl ether or a perfluorinated C3-C8 olefin such as for example hexafluoropropylene (HFP). The term 'perfluorinated monomer' as used in connection with the present invention not only includes monomers consisting of carbon and fluorine atoms but also includes monomers in which some of the fluorine atoms are replaced by chlorine or bromine such as for example in chlorotrifluoroethylene. Nevertheless, a perfluorinated monomer as used herein does not have carbon-hydrogen bonds in the molecule.

The aqueous emulsion polymerization is carried out in the presence of a fluorinated surfactant. An effective amount of fluorinated surfactant should typically be used to sufficiently stabilize the PTFE particles and to obtain a desired particle size of the PTFE particles. The amount of fluorinated surfactant is generally between 0.03 and 1%, preferably between 0.08 and 0.5% by weight relative to the amount of water used in the aqueous emulsion polymerization. Following polymerization, the fluorinated surfactant may be recovered from the dispersion and replaced with a non-ionic surfactant using an anion exchange resin as disclosed in WO00/35971.

Any of the fluorinated surfactants known or suitable for use in aqueous emulsion polymerization of fluorinated monomers can be used. Particularly suitable fluorinated surfactants are typically anionic fluorinated surfactants that are non-telogenic and include those that correspond to the formula:

$$Q\text{-}R_f\text{-}Z\text{-}M^a \qquad (I)$$

wherein Q represents hydrogen, Cl or F whereby Q may be present in terminal position or not; $R_f$ represents a linear or branched perfluorinated alkylene having 4 to 15 carbon atoms; Z represents $COO^-$ or $SO_3^-$, $M^a$ represents a cation including an alkali metal ion or an ammonium ion. Representative examples of emulsifiers according to above formula (I) are perfluoroalkanoic acids and salts thereof such as perfluorooctanoic acid and its salts in particular ammonium salts.

Further fluorinated surfactants that may be used include perfluoropolyether surfactants such as disclosed in EP 1059342, EP 712882, EP 752432, EP 816397, U.S. Pat. Nos. 6,025,307, 6,103,843 and 6,126,849. Still further surfactants that have been used are disclosed in U.S. Pat. Nos. 5,229,480, 5,763,552, 5,688,884, 5,700,859, 5,804,650, 5,895,799, WO 00/22002 and WO 00/71590.

The aqueous emulsion polymerization of TFE is initiated with a free radical initiator. Any of the known or suitable initiators for initiating an aqueous emulsion polymerization of TFE can be used. Suitable initiators include organic as well as inorganic initiators although the latter are generally preferred. Examples of inorganic initiators that can be used include for example ammonium- alkali- or earth alkali salts of persulfates, permanganic or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added.

Generally, when manganic or permanganic based initiators are used, the manganic ions may be removed subsequent to the polymerization by contacting the resulting dispersion with a cation exchange resin.

The polymerization will typically be conducted at a temperature of 10 to 100° C., preferably between 20° C. and 90° C. and at a pressure of 4 to 30 bar, preferably 10 to 25 bar. The aqueous emulsion polymerization system may further comprise auxiliaries, such as buffers, complex-formers and gas carriers. In a particular embodiment, a seeded polymerization may be used to produce the PTFE particles. That is, the polymerization is initiated in the presence of small particles of fluoropolymer, typically small PTFE particles having a volume average diameter of between 50 and 100 nm. Such seed particles may be produced in a separate aqueous emulsion polymerization and may be used in an amount of 20 to 50% by weight based on the weight of water in the aqueous emulsion polymerization. The use of seed particles allows better control over the PTFE particle size that is desired and avoids formation of coagulum during polymerization which could cause explosion during the polymerization. The seed particles may for example be produced by polymerizing TFE in the presence of small amounts of a partially fluorinated monomer (e.g. as disclosed below) or a perfluorinated co-monomer such as a perfluoroalkyl vinyl monomer or a perfluorinated vinyl ether or other perfluorinated co-monomer as disclosed below.

At the final stage of the polymerization, a partially fluorinated co-monomer or a non-fluorinated comonomer is added so as to obtain particles having a shell that comprises a copolymer of TFE and a partially fluorinated comonomer or non-fluorinated comonomer. Suitable partially fluorinated co-monomers for use in the final polymerization stage include those according to the general formula:

$$CR^1R^2\!\!=\!\!CFR^3$$

wherein each of $R^1$, $R^2$ and $R^3$ independently represents H, Cl, F or a perfluoro alkyl group, for example of 1 to 3 carbon atoms, with the proviso that at least one of $R^1$, $R^2$ and $R^3$ represents H. Specific examples of partially fluorinated co-monomers that may be used include vinylidene fluoride, trifluoroethene, pentafluoropropene and heptafluorobutene. Suitable non-fluorinated co-monomers include alpha-olefins such as ethylene and propylene.

The final polymerization stage, during which one or more of the aforementioned co-monomers are added, is typically defined as the stage during which the last 25% by weight or less of polymer solids are produced and accordingly, the shell would constitute 25% by weight or less of the total weight of the PTFE particle. In a particular embodiment, the shell constitutes not more than 20% by weight or not more than 15% by weight of the PTFE particle weight. The total amount of partially fluorinated and/or non-fluorinated monomer used in the final polymerization stage is typically chosen so as to produce a TFE copolymer that has between 0.05 and 20% by weight of partially fluorinated and/or non-fluorinated comonomer or typically between 0.1% and 10% by weight. In a particular embodiment, the amount of partially fluorinated and/or non-fluorinated comonomer in the TFE copolymer of the shell is between 0.5 and 5% by weight.

In a particular embodiment, a perfluorinated co-monomer may be used in addition to the partially fluorinated or non-fluorinated comonomer in the final polymerization stage. Examples of perfluorinated co-monomers include perfluorinated vinyl ethers, for example those of the formula:

$$CF_2\!\!=\!\!CF\!\!-\!\!O\!\!-\!\!R_f$$

wherein $R_f$ represents a perfluorinated aliphatic group that may contain one or more oxygen atoms. Specific examples include perfluoroalkyl vinyl ethers such as perfluoromethyl vinyl ether (PMVE), perfluoroethyl vinyl ether and perfluoro n-propyl vinyl ether (PPVE-1), perfluoro-2-propoxypropylvinyl ether (PPVE-2), perfluoro-3-methoxy-n-propylvinyl ether and perfluoro-2-methoxy-ethylvinyl ether. Particular perfluoro alkyl vinylethers include gaseous perfluoro alkyl vinylethers or those that have a vapor pressure of at least 10 kPa at polymerization temperature. Further examples of suitable perfluorinated comonomers include perfluorinated allyl ethers and perfluorinated olefins having 3 to 8 carbons such as for example hexafluoropropylene.

The total amount of comonomer, whether fully fluorinated, partially fluorinated or non-fluorinated, used to prepare the PTFE particles should generally be kept low enough so as not to impair the overall non-melt processable characteristics of the PTFE particles. Accordingly, the total amount of comonomer should typically not exceed 1% by weight based on the total weight of PTFE.

During the final polymerization stage, further amounts of initiator or initiator components may be added to increase the polymerization rate and/or to reduce the molecular weight of the copolymer formed. Further, during the final polymerization stage, one or more chain transfer agents may be added as well.

Thus, in a particular embodiment, the PTFE particles may be obtained by using a seed polymerization of TFE using PTFE particles that have been produced by copolymerizing TFE with a partially fluorinated or perfluorinated comonomer. At the final stage of the polymerization is then added the partially fluorinated or non-fluorinated comonomer. Accordingly, the thus produced PTFE particles will comprise a core of a copolymer of TFE, an intermediate shell of homopolymer of TFE and a shell of copolymer of TFE and partially fluorinated or non-fluorinated comonomer. Further details regarding the polymerization conditions to produce such PTFE particles may be found in EP 30663. Typically, the core will comprise between 5 and 15% by weight of the PTFE particle and the homopolymer of PTFE will comprise between 90 and 70% by weight.

The PTFE particles typically have an average particle size (volume average diameter) of 20 nm to 500 nm, typically 50 nm to 350 nm. In a particular embodiment in connection with this invention, a mixture of PTFE particles is used that have a distinct average particle size such the mixture has a bimodal or multi-modal distribution in particle size. For example, in one embodiment, a mixture of PTFE particles having an average particle size of not more than 100 nm, for example between 20 and 90 nm or between 50 and 80 nm, is mixed with PTFE particles having an average particle size of at least 180 nm, for example 190 nm to 400 nm or 200 nm to 350 nm. When a mixture of PTFE particles is used, at least one of the PTFE particle dispersion used to obtain the mixture should be comprised of PTFE particles according to the invention that have a shell of the TFE copolymer.

The amount of PTFE particles according to the invention in the coating composition may vary widely and will generally depend on whether the coating composition is to be used in a single coating system or multi-layer coating system. When used in a multi-layer coating system, the amount of PTFE particles according to the invention will generally differ depending on whether the coating composition is for a primer layer, an intermediate coating layer or the topcoating layer. Generally, a high amount should be used in the primer layer and a lower amount can be used in the intermediate and/or topcoat layer. Further, in a multi-layer coating system, at least one of the coating layers should include the PTFE particles according to the invention and generally at least the primer layer will include such PTFE particles. PTFE particles according to the invention may or may not be used in an intermediate and/or topcoat layer but, when such layer includes the non-fluorinated polymer, it will generally be advantageous to also use the PTFE particles according to the invention in such intermediate and/or topcoat layer. Generally, the amount of PTFE particles according to the invention will constitute at least 10% by weight, or at least 50% by weight of the total amount of non-melt processable polytetrafluoroethylene in the composition, with the appropriate and optimal amount being dependent on such factors as afore discussed. In another embodiment, all of the PTFE particles in the composition are according to the invention.

The amount of PTFE particles according to the invention having in their shell a copolymer of TFE and a partially fluorinated or non-fluorinated monomer is comprised in the composition in an amount of at least 10% by weight, typically between 15% by weight and 65% by weight based on the total weight of solids in the composition.

The composition additionally contains a non-fluorinated polymer selected from the group consisting of a polysulfone, a polyamide, a polyimide, a polyamide-imide, a polybismaleimide and mixtures thereof. Examples of polyamide imide and polybismaleimide polymers include those disclosed in U.S. Pat. Nos. 4,548,986 and 4,049,863. Examples of suitable polyamides include aromatic polyamides as disclosed in U.S. Pat. No. 4,548,986. Suitable polysulfone resins include the polyether sulfones disclosed in U.S. Pat. Nos. 3,981,945, 4,090,933 and 4,131,711. The non-fluorinated polymer is typically comprised in the composition in an amount of at least 10% by weight, typically between 10% by weight and 50% by weight based on the total weight of solids in the composition. The amount of the non-fluorinated polymer may vary depending on whether the coating composition is for a primer, an intermediate or a topcoat layer. Generally, the amount of binder will be larger in a coating composition for a primer and may be used in a lesser amount or may not be used at all in an intermediate layer or a topcoat layer. The non-fluorinated polymer in a coating composition for the primer is typically used in a weight ratio of 2:1 to 4:1 relative to the total amount of PTFE particles.

The composition may further contain a perfluorinated melt-processible fluoropolymer such as e.g. a copolymer of TFE that is melt-processible. Examples of such copolymers include copolymers of TFE and HFP which are known in the art as FEP polymers or copolymers of TFE and a perfluorinated vinyl ether, such as those disclosed above, which are known in the art as PFA polymers. Typically, such copolymers may be produced by emulsion polymerization and will result in an aqueous dispersion which can be blended with the other components of the composition for the primer coating. Generally, the average particle size of such copolymers is between 20 nm and 500 nm and typically between 50 and 350 nm. According to a particular embodiment, the mixture of PTFE particles and copolymer particles form a bimodal or multi-modal particle size distribution. For example, in one embodiment the PTFE particles may have an average particle size of at least 180 nm and the particle size of the copolymer particles is not more than 100 nm, typically not more than 80 nm.

The coating composition may contain further components such as organic solvents, colloidal silica, mica, fillers, coloring agents, levelling agents and tackifiers. Generally, the coating composition also includes one or more surfactants to stabilize the composition. Some of these surfactants may result from the aqueous emulsion polymerization used to produce the PTFE particles and optional TFE copolymer. Such surfactants are fluorinated surfactants. It will however be preferred to minimize the amount thereof and accordingly, such fluorinated surfactants are preferably substantially removed from the fluoropolymer dispersions used to make the primer coating composition. Typically, the amount of fluorinated surfactant in the composition is not more than 100 ppm or not more than 50 ppm based on the combined amount of PTFE particles and optional TFE copolymer. Frequently, the composition will include one or more non-ionic surfactants such as ethoxylated and/or propoxylated alcohols, in particular ethoxylated aliphatic alcohols or ethoxylated aromatic alcohols. The composition may additional include one or more anionic hydrocarbon surfactants.

The coating composition can be conveniently produced by blending together the various components making up the composition. Generally the PTFE particles will be in the form an aqueous dispersion and the optional copolymer of TFE is generally also in the form of an aqueous dispersion. These dispersions may be simply blended together and the non-fluorinated polymer may be added thereto. The non-fluorinated polymer may be in the form of an aqueous dispersion as well or may be dissolved or dispersed in an organic solvent such as for example an aromatic solvent such as toluene, xylene and the like. Other further ingredients may be added to the composition as aqueous dispersion or from a solution or dispersion in an organic solvent.

The coating composition according to the invention can be used to provide an anti-stick coating on a substrate. The coating composition can be used in connection with a single layer coating system but is generally used in connection with a multi-layer coating system. In one embodiment, the coating composition is used to provide a primer coating on various substrates on which firm adhesion of PTFE and other fluoropolymers is desired. Further layers of the multi-layer coating system may or may not be provided with a coating composition according to the invention. Thus in one embodiment of a two-layer coating system, the primer and the topcoat are provided by using a coating composition according to the invention.

In another embodiment, the primer coating and intermediate coating(s) of a multi-layer coating system are provided using a coating composition according to the invention and the topcoat is provided using another composition, for example one which does not comprise the non-fluorinated binder and which comprises PTFE particles that do not necessarily include a copolymer of TFE and a partially fluorinated or non-fluorinated copolymer in the shell.

Generally, the composition is particularly beneficial to provide at least a primer coating on metal substrates or glass substrates. Examples of metal substrates include aluminium, steel and stainless steel. Prior to application of the composition to these substrates, the substrate may be roughened to further enhance adhesion of the primer coating to the substrate. Typically, sand blasting or etching is used to roughen a metal substrate. The substrate may be a so-called smooth substrate. A smooth substrate is typically obtained by chemical cleaning and light etching of the substrate and typically has an average roughness (Ra) of less than 2.5 µm and preferably less than 1.25 µm. By comparison, an untreated rolled aluminium substrate has a roughness of 0.25 to 0.5 µm and a sandblasted or gritblasted aluminium may have an average roughness of 4 to 5.25 µm. The composition may be applied by any of the known techniques to apply coatings to substrates including for example spray coating, roller coating, curtain coating or coil coating the composition.

Following application of the composition, the primer coating is generally dried by subjecting the coating to elevated temperature of e.g. 50 to 100° C., generally 80 to 90° C. The primer coating may then be further coated with one or more layers of non-melt processible PTFE. Such one or more layers of PTFE may or may not comprise melt-processible fluoropolymers such as melt-processible copolymers of TFE and may or may not use a coating composition according to the invention. When such melt-processible TFE copolymers are used, the ratio thereof may be varied in a multi-layer coating so as to create a gradient of increasing amount of PTFE towards the top coating. Like-wise, the ratio of the non-fluorinated polymer to the PTFE particles may be varied to a create a gradient of decreasing amount of non-fluorinated polymer towards the top coating.

Following application of the primer coating and further one or more coatings, the obtained multi-layer coated substrate is baked or sintered. Generally, baking is carried out in an oven at a temperature of 350° C. to 450° C., typically from 370° C. to 400° C. The baking time may vary from 1 to 20 min. and the oven may have a constant temperature or an increasing temperature profile may be used, i.e. the temperature may be increased from an initial lower temperature to a higher temperature later in the baking cycle. Generally, baking of the coated article is carried out by conveying the coated article through an oven with an increasing temperature profile from entrance to exit.

The invention is further illustrated with reference to the following examples without the intention to limit the invention thereto.

EXAMPLES

Preparation of TFE Core Shell Polymers

A. Preparation of Seed Latex 100 l deionized water containing 400 g ammonium perfluoro octanoate (APFO) were fed in a 150 l polymerization vessel. Air was removed by alternating evacuation and pressurizing with nitrogen up to 6 bar. Then 140 g HFP were fed in the vessel. The temperature in the vessel was adjusted to 35° C. The vessel was pressurized with TFE to 15 bar (abs.). Then 100 ml deionized water containing 0.5 g $Na_2S_2O_5$, 25 g 25% ammonia solution and 20 mg $CuSO_4 \times 5$ $H_2O$ were pumped in the vessel. The polymerization was started by quickly pumping 100 ml deionized water containing 1.1 g APS in the vessel. Polymerization temperature and pressure were kept constant. Uptake rate of TFE was adjusted to about 12 kg/h by properly adjusting the speed of agitation. When 11 kg TFE were consumed, polymerization was stopped by closing the TFE-feeding and lowering the speed of agitation. The vessel was vented and the resulting dispersion discharged. The thus obtained dispersion had a solid content of 10% and particle size of about 100 nm. This dispersion is called in the following "seed latex".

B. Synthesis of Comparative PTFE Polymer Particles Not Having a TFE Copolymer in the Shell.

20 l seed latex prepared as described above were charged in the 150 l polymerization vessel together with 80 l deionized water containing 270 g ammonium octanoate. Air was removed as described in Example 1. The vessel was pressurized with TFE to 15 bar abs. and the temperature adjusted to 42° C. Polymerization was conducted at constant pressure and temperature. 200 ml aqueous solution containing 0.7 g APS, 20 mg $CuSO_4 \times 5$ $H_2O$ and 120 g 25% aqueous ammonia solution were charged into the vessel. Polymerization was initiated by continuously pumping in the vessel an aqueous solution containing 0.50 g azodicarboxyl diamide (ADA) dissolved in 10 l deionized water containing 15 ml 10% NaOH. The ADA solution to be continuously fed had a concentration of 0.05 g ADA/l. Pumping rate for the first 10 min was 50 ml/min and then lowered to 15-25 ml/min. Feeding rate and agitation speed was adjusted to achieve an uptake rate for TFE of about 12 kg/h. When 22 kg TFE were consumed, polymerization was stopped by interrupting the feeding of the ADA-solution and TFE. The vessel was vented and the dispersion was discharged. The so obtained dispersion had a solid content of about 21 wt-% and a particle size of 220 nm.

5 wt-% Triton® X 100 based on solid content was added and the APFO was reduced by ion-exchange to a level of less than 10 ppm based on solids. The dispersions were thermally upconcentrated to obtain a total solids of 58% by weight. To the dispersion was further added an anionic surfactant (Hostapur™ SAS 30) in an amount of 2000 ppm relative to the amount of PTFE solids.

C. Synthesis of PTFE Polymer Particles 1 to 3 According to the Invention

Polymerization to produce PTFE particles 1 to 3 was generally carried out as described above for the comparative PTFE polymer particles, except that when 90% by weight of the TFE had been fed to the polymerization, feeding of ADA was stopped and a solution of 0.8 g $Na_2S_2O_5$ in 50 g water was first charged into the vessel followed by a solution containing 0.8 g APS, 20 mg $CuSO_{4 \times 5}H_2O$ and 60 g 25% aqueous ammonia solution in 150 ml water. After that 20 g VDF (ex 1), 40 g VDF (ex 2) or 10 g VDF and 28 g HFP (ex 3) were added to the polymerization vessel. When a total amount of 23 kg TFE was consumed, polymerization was stopped by closing the TFE-feeding. The vessel was vented and the dispersion discharged. 5 wt-% Triton® X 100 based on solid content was added and the APFO was reduced by ion-exchange to a level of less than 10 ppm based on solids. The dispersions were thermally upconcentrated to obtain a total solids of 58% by weight. To the dispersion was further added an anionic surfactant (Hostapur™ SAS 30) in an amount of 2000 ppm relative to the amount of PTFE solids.

Preparation of Coatings

Smooth and sandblasted aluminium plates (100×100×1 mm) were degreased with acetone prior to coating. A two coat system was used:

Primer Coat

The composition for the primer coat was prepared by blending 67.8 parts Greblon™ black base concentrate, obtained from Weilburger Lackfabrik J. Grebe GmbH, comprising Polyamide imide binder (PAI), 17.24 parts of the PTFE dispersion and 14.96 parts salt-free water. The weight ratio of PAI to PTFE in the coating composition was 1:1. The primer coat was applied to the aluminium plates by spray application at a pressure of 2 bar, using a Binks™ Model 96 spray gun, so as to obtain a dry coating thickness of about 15-20 μm. The coated aluminium plates were dried at 90° C. during 5 minutes and allowed to cool to room temperature.

Topcoat

The composition for the topcoat was prepared by blending 13.10 parts Greblon™ Antistic Topcoat Concentrate (available from Weilburger Lackfabrik J. Grebe GmbH), 72.0 parts of PTFE dispersion and 14.9 parts salt-free water. The composition for the topcoat did not contain PAI. The topcoat was applied to the aluminium plates coated with a primer coat, as described above, using a spray gun, so as to obtain a dry coating thickness of 25-35 μm. The coated aluminium plates were dried at 90° C. during 5 min, followed by 250° C. during 10 min and finally the coated plates were sintered at 400° C. during 10 min.

Test Methods

Pen Ball Test

The hardness of the coated substrates was tested in accordance with the Whitford Test Method 137C, using a Whitford Scratch tester. The substrate used was a smooth aluminium substrate. The pen ball test is done with vegetable oil at 170° C. as is described in WO 02/14065. The higher the test value, the better.

Crosshatch Test

The adhesion of the coatings to the substrate was evaluated using the crosshatch test, in accordance with DIN EN ISO 2409. A crosshatch pattern of 1 mm was made in the coated substrates by using a knife. Adhesive tape (Tesa™ 4104/50 mm) was applied as firmly as possible onto the cut lines. The adhesive tape was pulled vertically. After the tape was applied and pulled for 10 times, the appearance of the cut lines was evaluated according to DIN EN ISO 2409 (0=superior; 5=bad coating). Any damage to the topcoat and primer coat was determined under a microscope and is separately reported in below table.

Water and Salt Water Cooking Test

The coated substrates were immersed in boiling water or 10% salt water during 48 hours. After cooling to room temperature, the samples were tested according to the crosshatch test as given above.

Examples 1 to 3 and Comparative Example C-1

TFE polymer dispersions 1 to 3 and comparative TFE polymer dispersion were coated onto smooth and sandblasted aluminium plates as is given in the coating method described above. After drying and sintering, the coated plates were tested for their hardness and resistance against boiling water and salt water using the test methods as described above. The results are given in table 1.

TABLE 1

| | test results | | | |
|---|---|---|---|---|
| | Ex No | | | |
| | Ex 1 | Ex 2 | Ex 3 | C-1 |
| Comonomer in shell | VDF | VDF | VDF + HFP | / |
| Pen Ball test | | | | |
| | 7 | 7 | 8 | 2-3 |
| Cross hatch test/smooth substrate | | | | |
| topcoat | 1 | 1 | 0 | 4 |
| primer coat | 1-0 | 0 | 0 | 0 |
| Cross hatch test/sandblasted substrate | | | | |
| topcoat | 1 | 0 | 0 | 3 |
| primer coat | 0 | 0 | 0 | 0 |
| Water cooking test/smooth substrate | | | | |
| topcoat | 1 | 1 | 0 | 5 |
| primer coat | 0 | 2 | 0 | 1 |
| Water cooking test/sandblasted substrate | | | | |
| topcoat | 1-2 | 1 | 1 | 4 |
| primer coat | 0 | 0 | 0 | 0 |
| Salt water test/smooth substrate | | | | |

TABLE 1-continued

| | test results | | | |
|---|---|---|---|---|
| | Ex No | | | |
| | Ex 1 | Ex 2 | Ex 3 | C-1 |
| topcoat | 2 | 2 | 2 | 5 |
| primer coat | 1-0 | 1 | 1 | 3 |
| Salt water test/sandblasted substrate | | | | |
| topcoat | 1 | 2 | 1 | 5 |
| primer coat | 1-0 | 1 | 1 | 2 |

The results in table 1 indicate that coatings were obtained having a high hardness. The coatings showed a high resistance against boiling water and boiling salt water.

What is claimed is:

1. An aqueous coating-composition comprising (i) an aqueous dispersion having particles of a non-melt processible polymer of tetrafluoroethylene and (ii) a non-fluorinated polymer selected from the group consisting of a polysulfone, a polyamide, a polyimide, a polyamide-imide, a polybismaleimide and mixtures thereof, wherein the particles are core-shell particles whereby the shell comprises a copolymer of tetrafluoroethylene and a partially fluorinated or a non-fluorinated comonomer.

2. An aqueous coating composition according to claim 1 wherein the partially fluorinated comonomer comprises vinylidene fluoride, trifluoroethene, pentafluoropropene, or heptafluorobutene.

3. An aqueous coating composition according to claim 1 wherein the shell comprises a copolymer of tetrafluoroethylene, a partially fluorinated comonomer and a perfluorinated comonomer.

4. An aqueous coating composition according to claim 3 wherein the perfluorinated comonomer is selected from perfluorinated alkyl vinyl monomers and perfluorinated vinyl ethers.

5. An aqueous coating composition according to claim 1 further comprising a non-ionic surfactant and wherein the amount of fluorinated surfactant is not more than 100ppm based on the total amount of polytetrafluoroethylene solids and optional solids of a perfluorinated melt-processible polymer.

6. An aqueous coating composition according to claim 1 further comprising a perfluorinated melt-processible polymer.

7. An aqueous coating composition according to claim 6 wherein the perfluorinated melt-processible polymer is a copolymer of tetrafluoroethylene and a perfluorinated comonomer.

8. Aqueous coating composition according to claim 1 wherein the core of the core-shell particles comprises homopolymer of tetrafluoroethylene and/or a copolymer of tetrafluoroethylene and a perfluorinated comonomer.

9. Aqueous coating composition according to claim 1 wherein the copolymer of tetrafluoroethylene and a partially fluorinated comonomer comprised in the shell constitutes not more than 25% by weight of the total weight of the particle.

10. An aqueous coating composition according to claim 1 wherein the non-fluorinated comonomer comprises vinylidene fluoride.

11. An aqueous coating composition according to claim 1 wherein the partially fluorinated or non-fluorinated comonomer in the shell is between 0.05 and 20% by weight.

12. An aqueous coating composition according to claim 1 wherein the partially fluorinated or non-fluorinated comonomer in the shell is between 0.1 and 10% by weight.

13. An aqueous coating composition according to claim 1 wherein the partially fluorinated or non-fluorinated comonomer in the shell is between 0.5 and 5% by weight.

* * * * *

UNITED STATES PATENT AND TRADEMARK OFFICE
CERTIFICATE OF CORRECTION

PATENT NO. : 7,462,667 B2
APPLICATION NO. : 11/172345
DATED : December 9, 2008
INVENTOR(S) : Michael C. Dadalas Page 1 of 1

It is certified that error appears in the above-identified patent and that said Letters Patent is hereby corrected as shown below:

Column 9
Line 28, delete "$CuSO_{4x5}H_2O$" and insert -- $CuSO_4 x5H_2O$ --, therefor.

Signed and Sealed this

Twenty-fourth Day of February, 2009

JOHN DOLL
*Acting Director of the United States Patent and Trademark Office*